(12) United States Patent
Lightner et al.

(10) Patent No.: US 9,547,701 B2
(45) Date of Patent: Jan. 17, 2017

(54) METHOD OF DISCOVERING AND EXPLORING FEATURE KNOWLEDGE

(71) Applicant: QBASE, LLC, Reston, VA (US)

(72) Inventors: Scott Lightner, Leesburg, VA (US); Sanjay Boddhu, Dayton, OH (US); Robert Flagg, Portland, ME (US)

(73) Assignee: QBase, LLC, Reston, VA (US)

( * ) Notice: Subject to any disclaimer, the term of this patent is extended or adjusted under 35 U.S.C. 154(b) by 0 days.

(21) Appl. No.: 14/557,931

(22) Filed: Dec. 2, 2014

(65) Prior Publication Data

US 2015/0154268 A1 Jun. 4, 2015

Related U.S. Application Data

(60) Provisional application No. 61/910,883, filed on Dec. 2, 2013.

(51) Int. Cl.
*G06F 7/00* (2006.01)
*G06F 17/30* (2006.01)

(52) U.S. Cl.
CPC ... *G06F 17/30554* (2013.01); *G06F 17/30542* (2013.01); *G06F 17/30864* (2013.01)

(58) Field of Classification Search
CPC .................. G06F 17/30864; G06F 17/30554; G06F 17/30542
USPC ........................................................ 707/722
See application file for complete search history.

(56) References Cited

U.S. PATENT DOCUMENTS

| | | | |
|---|---|---|---|
| 6,128,660 A | 10/2000 | Grimm et al. | |
| 6,154,213 A * | 11/2000 | Rennison | G06F 17/30716 345/428 |
| 6,178,529 B1 | 1/2001 | Short et al. | |
| 6,266,781 B1 | 7/2001 | Chung et al. | |
| 6,353,926 B1 | 3/2002 | Parthesarathy et al. | |
| 6,457,026 B1 | 9/2002 | Graham et al. | |
| 6,738,759 B1 | 5/2004 | Wheeler et al. | |
| 6,832,373 B2 | 12/2004 | O'Neill | |
| 6,832,737 B2 | 12/2004 | Karlsson et al. | |
| 7,058,846 B1 | 6/2006 | Kelkar et al. | |
| 7,099,898 B1 * | 8/2006 | Nakamura | G06F 17/30595 |
| 7,370,323 B2 | 5/2008 | Marinelli et al. | |
| 7,421,478 B1 | 9/2008 | Muchow | |
| 7,447,940 B2 | 11/2008 | Peddada | |
| 7,543,174 B1 | 6/2009 | van Rietschote et al. | |
| 7,681,075 B2 | 3/2010 | Havemose et al. | |

(Continued)

FOREIGN PATENT DOCUMENTS

WO 2013/003770 A2 1/2013

OTHER PUBLICATIONS

International Search Report dated Apr. 15, 2015 corresponding to International Patent Application No. PCT/US2014/067994, 4 pages.

(Continued)

*Primary Examiner* — Kannan Shanmugasundaram
(74) *Attorney, Agent, or Firm* — Eric L. Sophir; Dentons US LLP

(57) ABSTRACT

Methods and systems for discovering and exploring feature knowledge included in large corpora are disclosed. The described systems and methods may include the application of in-memory analytics to records, where the analytic methods applied to the records and the level of precision of the methods may be dynamically selected by a user.

18 Claims, 3 Drawing Sheets

(56) References Cited

U.S. PATENT DOCUMENTS

| | | | |
|---|---|---|---|
| 7,818,615 B2 | 10/2010 | Krajewski et al. |
| 7,899,871 B1 | 3/2011 | Kumar et al. |
| 8,055,933 B2 | 11/2011 | Jaehde et al. |
| 8,122,026 B1 | 2/2012 | Laroco et al. |
| 8,332,258 B1 | 12/2012 | Shaw |
| 8,341,622 B1 | 12/2012 | Eatough |
| 8,345,998 B2 | 1/2013 | Malik et al. |
| 8,356,036 B2 | 1/2013 | Bechtel et al. |
| 8,375,073 B1 | 2/2013 | Jain |
| 8,423,522 B2 | 4/2013 | Lang et al. |
| 8,429,256 B2 | 4/2013 | Vidal et al. |
| 8,726,267 B2 | 5/2014 | Li et al. |
| 8,782,018 B2 | 7/2014 | Shim et al. |
| 8,995,717 B2 | 3/2015 | Cheng et al. |
| 9,009,153 B2 | 4/2015 | Khan et al. |
| 9,025,892 B1 | 5/2015 | Lightner et al. |
| 9,032,387 B1 | 5/2015 | Hill et al. |
| 9,087,005 B2 | 7/2015 | Chen et al. |
| 9,201,744 B2 | 12/2015 | Lightner et al. |
| 2001/0037398 A1 | 11/2001 | Chao et al. |
| 2002/0031260 A1 | 3/2002 | Thawonmas et al. |
| 2002/0165847 A1 | 11/2002 | McCartney et al. |
| 2002/0174138 A1 | 11/2002 | Nakamura et al. |
| 2003/0028869 A1 | 2/2003 | Drake et al. |
| 2003/0112792 A1 | 6/2003 | Cranor et al. |
| 2003/0158839 A1* | 8/2003 | Faybishenko et al. ........... 707/3 |
| 2003/0182282 A1 | 9/2003 | Ripley |
| 2004/0010502 A1 | 1/2004 | Bomfim et al. |
| 2004/0027349 A1 | 2/2004 | Landau et al. |
| 2004/0049478 A1 | 3/2004 | Jasper |
| 2004/0143571 A1 | 7/2004 | Bjornson et al. |
| 2004/0153869 A1 | 8/2004 | Marinelli et al. |
| 2004/0205064 A1 | 10/2004 | Zhou et al. |
| 2004/0215755 A1 | 10/2004 | O'Neill |
| 2004/0243645 A1 | 12/2004 | Broder et al. |
| 2005/0091211 A1* | 4/2005 | Vernau et al. ................... 707/6 |
| 2005/0192994 A1 | 9/2005 | Caldwell et al. |
| 2006/0101081 A1 | 5/2006 | Lin et al. |
| 2006/0294071 A1 | 12/2006 | Weare et al. |
| 2007/0005639 A1 | 1/2007 | Gaussier et al. |
| 2007/0073708 A1 | 3/2007 | Smith et al. |
| 2007/0100806 A1* | 5/2007 | Ramer et al. ................... 707/3 |
| 2007/0156748 A1 | 7/2007 | Emam et al. |
| 2007/0174289 A1* | 7/2007 | Utiger ........................... 707/10 |
| 2007/0203693 A1 | 8/2007 | Estes |
| 2007/0203924 A1 | 8/2007 | Guha et al. |
| 2007/0240152 A1 | 10/2007 | Li et al. |
| 2007/0250519 A1 | 10/2007 | Fineberg et al. |
| 2007/0282959 A1 | 12/2007 | Stern |
| 2008/0010683 A1 | 1/2008 | Baddour et al. |
| 2008/0027920 A1 | 1/2008 | Schipunov et al. |
| 2008/0077570 A1 | 3/2008 | Tang et al. |
| 2009/0019013 A1 | 1/2009 | Tareen et al. |
| 2009/0043792 A1 | 2/2009 | Barsness et al. |
| 2009/0049038 A1 | 2/2009 | Gross |
| 2009/0089626 A1 | 4/2009 | Gotch et al. |
| 2009/0094484 A1 | 4/2009 | Son et al. |
| 2009/0144609 A1 | 6/2009 | Liang et al. |
| 2009/0216734 A1 | 8/2009 | Aghajanyan et al. |
| 2009/0222395 A1 | 9/2009 | Light et al. |
| 2009/0240682 A1 | 9/2009 | Balmin et al. |
| 2009/0292660 A1 | 11/2009 | Behal et al. |
| 2009/0299999 A1 | 12/2009 | Loui et al. |
| 2009/0322756 A1 | 12/2009 | Robertson et al. |
| 2010/0077001 A1 | 3/2010 | Vogel et al. |
| 2010/0138931 A1 | 6/2010 | Thorley et al. |
| 2010/0223264 A1 | 9/2010 | Bruckner et al. |
| 2010/0235311 A1 | 9/2010 | Cao et al. |
| 2010/0274785 A1 | 10/2010 | Procopiuc et al. |
| 2011/0071975 A1 | 3/2011 | Friedlander et al. |
| 2011/0093471 A1 | 4/2011 | Brockway et al. |
| 2011/0099163 A1* | 4/2011 | Harris ............... G06F 17/30997 707/723 |
| 2011/0119243 A1 | 5/2011 | Diamond et al. |
| 2011/0125764 A1 | 5/2011 | Carmel et al. |
| 2011/0161333 A1 | 6/2011 | Langseth et al. |
| 2011/0282888 A1 | 11/2011 | Koperski et al. |
| 2011/0296390 A1 | 12/2011 | Vidal et al. |
| 2011/0296397 A1 | 12/2011 | Vidal et al. |
| 2012/0030220 A1 | 2/2012 | Edwards et al. |
| 2012/0059839 A1 | 3/2012 | Andrade et al. |
| 2012/0102121 A1 | 4/2012 | Wu et al. |
| 2012/0117069 A1 | 5/2012 | Kawanishi et al. |
| 2012/0131139 A1 | 5/2012 | Siripurapu et al. |
| 2012/0246154 A1 | 9/2012 | Duan et al. |
| 2012/0310934 A1 | 12/2012 | Peh et al. |
| 2012/0323839 A1 | 12/2012 | Kiciman et al. |
| 2012/0324395 A1* | 12/2012 | Cohen ............... G06F 17/30634 715/780 |
| 2013/0132405 A1 | 5/2013 | Bestgen et al. |
| 2013/0166480 A1 | 6/2013 | Popescu et al. |
| 2013/0166547 A1 | 6/2013 | Pasumarthi et al. |
| 2013/0290232 A1 | 10/2013 | Tsytsarau et al. |
| 2013/0303198 A1 | 11/2013 | Sadasivam et al. |
| 2013/0325660 A1 | 12/2013 | Callaway |
| 2013/0326325 A1 | 12/2013 | De et al. |
| 2014/0013233 A1 | 1/2014 | Ahlberg et al. |
| 2014/0022100 A1 | 1/2014 | Fallon et al. |
| 2014/0089237 A1 | 3/2014 | Adibi |
| 2014/0156634 A1 | 6/2014 | Buchmann et al. |
| 2014/0244550 A1 | 8/2014 | Jin et al. |
| 2014/0255003 A1 | 9/2014 | Abramson et al. |
| 2014/0280183 A1 | 9/2014 | Brown et al. |
| 2014/0351233 A1 | 11/2014 | Crupi et al. |
| 2015/0074037 A1 | 3/2015 | Sarferaz |
| 2015/0154079 A1 | 6/2015 | Lightner et al. |
| 2015/0154194 A1 | 6/2015 | Lightner et al. |
| 2015/0154200 A1 | 6/2015 | Lightner et al. |
| 2015/0154264 A1 | 6/2015 | Lightner et al. |
| 2015/0154283 A1 | 6/2015 | Lightner et al. |
| 2015/0154286 A1 | 6/2015 | Lightner et al. |
| 2015/0154297 A1 | 6/2015 | Lightner et al. |

OTHER PUBLICATIONS

Written Opinion of the International Searching Authority dated Apr. 15, 2015 corresponding to International Patent Application No. PCT/US2014/067994, 9 pages.

International Search Report and Written Opinion dated Mar. 6, 2015 corresponding to International Patent Application No. PCT/US2014/067993, 9 pages.

International Search Report and Written Opinion dated Mar. 10, 2015 corresponding to International Patent Application No. PCT/US2014/067999, 10 pages.

International Search Report and Written Opinion of the International Searching Authority dated Apr. 15, 2015 corresponding to International Patent Application No. PCT/US2014/068002, 10 pages.

International Search Report and Written Opinion dated Feb. 24, 2015 corresponding to International Patent Application No. PCT/US2014/067918, 10 pages.

International Search Report and Written Opinion dated Mar. 3, 2015 corresponding to International Patent Application No. PCT/US2014/067921, 10 pages.

Tunkelang, D., "Faceted Search," Morgan & Claypool Publ., 2009, pp. i-79.

Schuth, A., et al., "University of Amsterdam Data Centric Ad Hoc and Faceted Search Runs, "ISLA, 2012, pp. 155-160.

Tools, Search Query Suggestions using ElasticSearch via Shingle Filter and Facets, Nov. 2012, pp. 1-12.

Bouchenak, S., "Architecture-Based Autonomous Repair Management: An Application to J2EE Clusters", Proceedings of the 24th IEEE Symposium on Reliable Distributed Systems [online], 2005 [retrieved Dec. 16, 2015]. Retrieved from Internet: <URL: http://ieeexplore.ieee.org/stamp/stamp.jsp?tp=&arnumber=1541181>, pp. 1-12.

Wang, et al., "Automatic Online News Issue Construction in Web Environment,"Www 2008/Refereed Track: Search—Applications, Apr. 21-25, 2008—Beijing, China, pp. 457-466.

(56) References Cited

OTHER PUBLICATIONS

Blei et al., "Latent Dirichlet Allocation" Journal of Machine Learning Research 3 (2003), pp. 993-1022.
Chuang et al., "A Practical Web-based Approach to Generating Topic Hierarchy for Text Segments, "CIKM '04, Nov. 8-13, 2004, Washington, DC, USA, Copyright 2004 ACM 1-58113-874-0/04/0011, pp. 127-136.
Vizard, The Rise of In-Memory Databases, Jul. 13, 2012.

* cited by examiner

METHOD OF DISCOVERING AND EXPLORING FEATURE KNOWLEDGE

CROSS-REFERENCE TO RELATED APPLICATIONS

This application is related to U.S. patent application Ser. No. 14/557,794, entitled "Method for Disambiguating Features in Unstructured Text, filed Dec. 2, 2014, now U.S. Pat. No. 9,239,875, issued Jan. 19, 2016; U.S. patent application Ser. No. 14/558,300, entitled "Event Detection Through Text Analysis Using Trained Event Template Models," filed Dec. 2, 2014, now U.S. Pat. No. 9,177,254, issued Nov. 3, 2015; and U.S. patent application Ser. No. 14/558,254, entitled "Design and Implementation of Clustered In-Memory Database," filed Dec. 2, 2014; U.S. patent application Ser. No. 14/558,101, entitled "Non-Exclusionary Search Within In-Memory Databases," filed Dec. 2, 2014, now U.S. Pat. No. 9,355,152, issued May 31, 2016; each of which are incorporated herein by reference in their entirety.

FIELD OF THE DISCLOSURE

The present disclosure relates in general to in-memory databases, and more specifically to search methods for discovering and exploring feature knowledge within in-memory databases.

BACKGROUND

Traditional search engines allow users to find just pieces of information that are relevant to an entity, and while millions or billions of documents may describe that entity the documents are generally not linked together. In most cases, it may not be viable to try to discover a complete set of documents about a particular feature. Additionally, methods that pre-link data are limited to a single method of linking and are fed by many entity extraction methods that are ambiguous and are not accurate. These systems may not be able to use live feeds of data; they may not perform these processes on the fly. As a consequence the latest information is not used in the linking process.

There is therefore a need for a dynamic and accurate method of discovering and navigating through feature knowledge that allows the user to tune how things are linked, depending on specific requirements.

SUMMARY

Methods for discovering and exploring feature knowledge are disclosed. The methods may include the application of in-memory analytics to records, where the analytic methods applied to the records and the level of precision of the methods may be dynamically selected by a user.

According to some embodiments, when a user starts a search, the system may score records against the one or more queries, where the system may score the match of one or more available fields of the records and may then determine a score for the overall match of the records. The system may determine whether the score is above a predefined acceptance threshold, where the threshold may be defined in the search query or may be a default value.

In further embodiments, fuzzy matching algorithms may compare records temporarily stored in collections with the one or more queries being generated by the system.

In some embodiments, numerous analytics computer modules may be plugged to the in-memory data base and the user may be able to modify the relevant analytical parameters of each analytics computer module through a user interface.

In one embodiment, a method is disclosed. The method comprises receiving, by a search manager computer, a search query from a user computing device configured to receive a selection, from a user, of an analytic computer that processes search query results for presentation to the user. The method further includes submitting, by the search manager computer, the search query to a search conductor computer for conducting a search, receiving, by the search manager computer, the search query results from the search conductor computer, the search query results having one or more records matching the search query, and forwarding, by the search manager computer, the search query results to the analytic computer selected by the user to process the search query results for the presentation. The method also includes receiving, by the search manager computer, the search query results processed by the analytic computer selected by the user, and returning, by the search manager computer, the search query results to the user device for the presentation to the user in accordance with the processing.

In another embodiment, a system is disclosed. The system comprises one or more server computers having one or more processors executing computer readable instructions for a plurality of computer modules including a search manager computer module configured to receive a search query from a user computing device that is configured to receive a selection, from a user, of an analytic computer module that processes search query results for presentation to the user. In the disclosed system, the search manager computer module is further configured to: submit the search query to a search conductor computer module configured to conduct a search, receive the search query results from the search conductor computer module, the search query results having one or more records matching the search query, forward the search query results to the analytic computer module selected by the user to process the search query results for the presentation, receive the search query results processed by the analytic computer module selected by the user, and return the search query results to the user device for the presentation to the user in accordance with the processing.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Glossary of Terms

Figure 1:
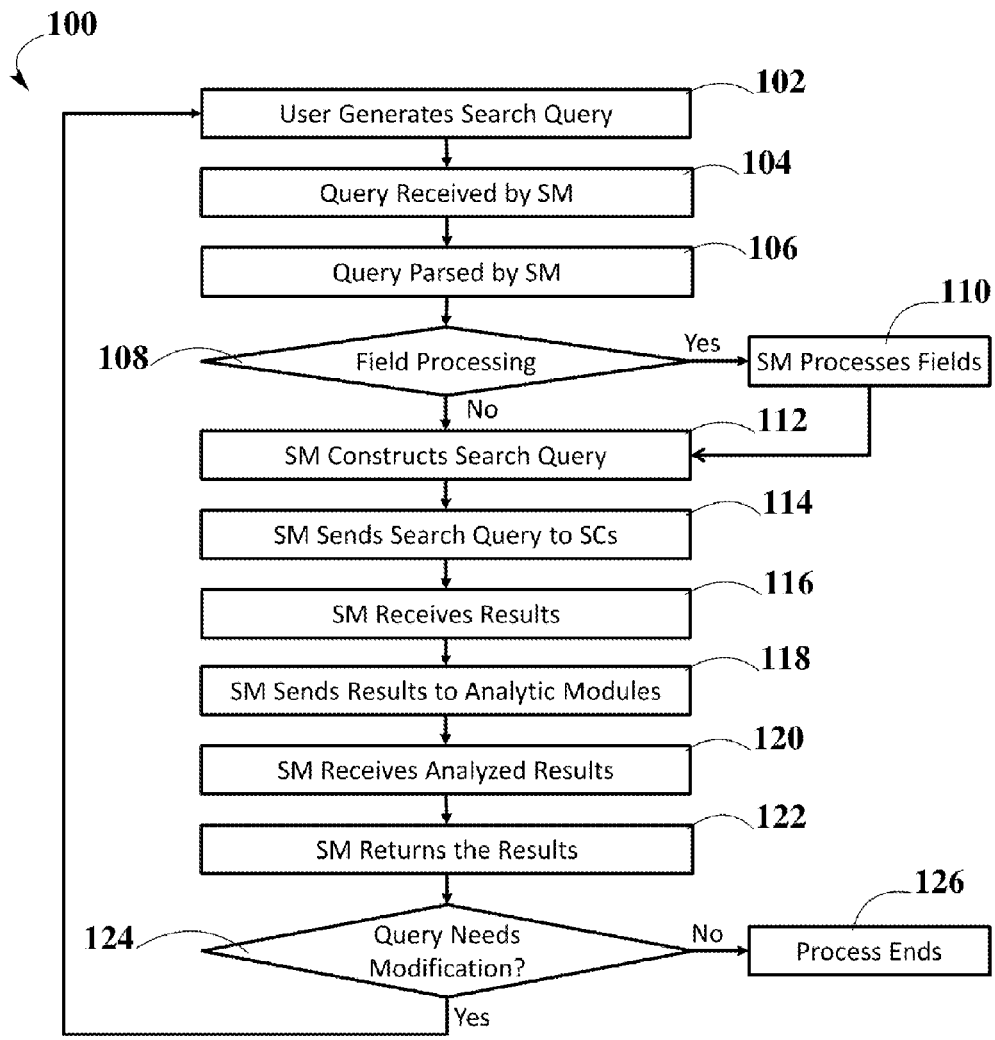
FIG. 1 is a flowchart of a search method for discovering and exploring feature knowledge, according to an embodiment.

As used herein, the following terms have the following definitions:

"Document" refers to a discrete electronic representation of information having a start and end.

"Corpus" refers to a collection of one or more electronic documents.

"Feature" refers to any information which is at least partially derived from an electronic document.

"Feature attribute" refers to metadata associated with a feature; for example, location of a feature in an electronic document, confidence score, among others.

"Facet" refers to clearly defined, mutually exclusive, and collectively exhaustive aspects, properties or characteristics of a class, specific subject, topic or feature.

"Knowledge base" refers to a computer database containing disambiguated features or facets.

"Live corpus" refers to a corpus that is constantly fed as new electronic documents are uploaded into a network.

"Memory" refers to any hardware component suitable for storing information and retrieving said information at a sufficiently high speed.

"Module" refers to a computer hardware and/or software component suitable for carrying out one or more defined tasks.

"Analytics Parameters" refers to parameters that describe the operation that an analytic computer module may have to perform in order to get specific results.

"Link on-the-fly module" refers to any linking module that performs data linkage as data is requested from the system rather than as data is added to the system.

"Node" refers to a computer hardware configuration suitable for running one or more modules.

"Node Cluster" refers to a set of one or more nodes.

"Query" refers to an electronic request to retrieve information from one or more suitable databases.

"Record" refers to one or more pieces of information that may be handled as a unit.

"Collection" refers to a discrete set of records.

"Partition" refers to an arbitrarily delimited portion of records of a collection.

"Prefix" refers to a string of a given length that includes the longest string of key characters shared by all subtrees of the node and a data record field for storing a reference to a data record.

"Database" refers to any computer system including any combination of node clusters and computer modules suitable for storing one or more collections and suitable to process one or more queries.

"Analytics Agent" or "Analytics Module" refers to a computer or computer module configured to at least receive one or more records, process said one or more records, and return the resulting one or more processed records.

"Search Manager" or "SM" refers to a computer or computer module configured to at least receive one or more queries and return one or more search results.

"Search Conductor" or "SC" refers to a computer or computer module configured to at least run one or more search queries on a partition and return the search results to one or more search managers.

"Sentiment" refers to subjective assessments associated with a document, part of a document, or feature.

"Topic" refers to a set of thematic information which is at least partially derived from a corpus.

DESCRIPTIONS OF EMBODIMENTS

The present disclosure is herein described in detail with reference to embodiments illustrated in the drawings, which form a part of this disclosure. Other embodiments may be used and/or other changes may be made without departing from the spirit or scope of the present disclosure. The illustrative embodiments described in the detailed description are not meant to be limiting of the subject matter presented herein.

The embodiments describes search methods for discovering and exploring feature knowledge that may be included in a large corpus. Embodiments introduce an on-the-fly analytics based search mechanism that can be employed efficiently on live and large data streams. The embodiments can facilitate discovery of new feature knowledge that can be used to update existing knowledge bases and also explore existing feature knowledge by employing different analytical methods (e.g., disambiguation, fuzzy matching, and topic relatedness), as may be specified by a user in an on-the-fly fashion. Further, embodiments of the presented search mechanism can apply to any type of data streams including text, image, and video. The following embodiments are performed by a central computer server system having one or more processors executing computer readable instructions corresponding to a plurality of special purpose computer modules described in FIGS. 1-2 below.

FIG. 1 is a flow chart describing a search method 100 for discovering and exploring feature knowledge, according to an embodiment.

The process may start when a user generates a search query, step 102. One or more user workstations (e.g., personal computer, smartphone, tablet computer, mobile device, or the like), which displays a user interface to the user, may generate and transmit one or more search queries. The user interfaces may receive from a user workstation a selection of an option of one or more of a set of analytic methods that may be applied to the results of the search query. The user workstations may also allow for the selection of thresholds of acceptance of different levels (e.g., of search query results). In an alternative embodiment, these queries and thresholds can be generated automatically, may be transmitted from a computing device, or may be predetermined.

Then, the query may be received, in step 104, by one or more search manager computer modules (SM) embodied on a computer readable medium and executed by a processor. In this step, the one or more queries generated by the interaction of one or more users with one or more user interfaces may be received by one or more search manager computer modules. In one or more embodiments, the queries may be represented in a markup language, including XML and HTML. In one or more other embodiments, the queries may be represented in a data structure, including embodiments where the queries are represented in JSON. In some embodiments, a query may be represented in compact or binary format.

Afterwards, the received queries may be parsed by the one or more SM computer modules, in step 106. This process may allow the system to determine if field processing is desired, in step 108. In one or more embodiments, the system may be capable of determining if the process is required using information included in the query. In one or more other embodiments, the one or more search manager computer modules may automatically or dynamically determine which one or more fields may undergo a desired processing.

If the system determined that field processing for the one or more fields is desired, the one or more SM computer modules may apply one or more suitable processing techniques to the one or more desired fields, during the search manager processes fields step 110. In one or more embodiments, suitable processing techniques may include address standardization, proximity boundaries, and nickname interpretation, among others. In some embodiments, suitable processing techniques may include the extraction of prefixes from strings and the generation of non-literal keys that may later be used to apply fuzzy matching techniques.

Then, when the one or more SM computer modules construct the search query, in step 112, they may construct additional search queries associated with the current search query. In one or more embodiments, the search queries may be constructed so as to be processed as a stack-based search.

Subsequently, one or more SM computer modules may send search query to one or more search conductor computer modules (SC), in step 114, where said one or more SC computer modules may be associated with collections specified in the one or more search queries.

The one or more search conductors may score records against the one or more queries, where the search conductors may score the match of one or more fields of the records and may then determine a score for the overall match of the records with the one or more queries. The system may determine whether the score is above a predefined acceptance threshold, where the threshold may be defined in the search query or may be a default value. In one or more embodiments, the default score thresholds may vary according to the one or more record fields being scored. If the SC computer module determines that the scores are above the desired threshold, the records may be added to a results list. The SC computer module may continue to score records until it determines that a record is the last in the partition. If the SC computer module determines that the last record in a partition has been processed, the SC computer module may then sort the resulting results list. The DC computer module may then return the results list to a SM computer module.

When SM computer module receives and collates search results from SC computer modules, step 116, the one or more search conductors return the one or more search results to the one or more search managers; where, in one or more embodiments, said one or more search results may be returned asynchronously. The one or more SM may then compile results from the one or more SC computer modules into one or more results lists.

The one or more SM computer modules may automatically determine which one or more fields may undergo one or more desired analytic processes. Then, the one or more SM computer modules may send the search results to analytic computer modules, in step 118. The one or more results lists compiled by one or more SM computer modules may be sent to one or more analytics agent computers, where each analytics agent computer may include one or more analytics computer modules configured to execute a corresponding one of the one or more suitable processing techniques.

In one or more embodiments, suitable techniques may include rolling up several records into a more complete record, performing one or more analytics on the results, and determining information about neighboring records, amongst others. In some embodiments, analytics agent computers may execute disambiguation computer modules, link computer modules, link on-the-fly computer modules, or other suitable computer modules and corresponding algorithms. The system may allow for user workstation to customize the analytics modules according to particular inputs.

After processing, according to some embodiments, the one or more analytics agents may return one or more processed results lists, step 120, to the one or more SM computer modules.

A SM computer module may return search results to the user device's user interface, step 122. In some embodiments, the one or more SM computer modules may decompress the one or more results list and return them to the user interface that initiated the query. According to some embodiments, the search results may be temporarily stored in a knowledge base database and returned to the user interface of the user computing device (e.g., workstation). The knowledge base may be used to temporarily store clusters of relevant disambiguated features. When new documents may be loaded into an in-memory database (MEMDB), the new disambiguated set of features may be compared with the existing knowledge base in order to determine the relationship between features and automatically determine if there is a match between the new features and previously extracted features. If the features comparison results in a match, the knowledge base may be automatically updated and the identification (ID) of the matching features may be returned. If the features compared do not match with any of the already extracted features, a unique ID is assigned to the disambiguated entity or feature, and the ID is associated with the cluster of defining features and stored within the knowledge base of the MEMDB.

When a user receives search results through a user interface of a user computing device, the user computing device may determine if a query needs further modification, in step 124, to achieve the desired results. If the desired results are achieved, the process may end, in step 126. If the desired results are not achieved, the user computing device may generate a new query by changing the type of analytics desired (e.g., by selecting a different analytics computer module executing a different analytics algorithm) or the level of precision and the user computing device may adjust how knowledge is linked to find stronger or looser relationships. In some embodiments, a new search may be generated and combined it with a current search.

Link On-the-Fly (OTF) Processing

Figure 2:
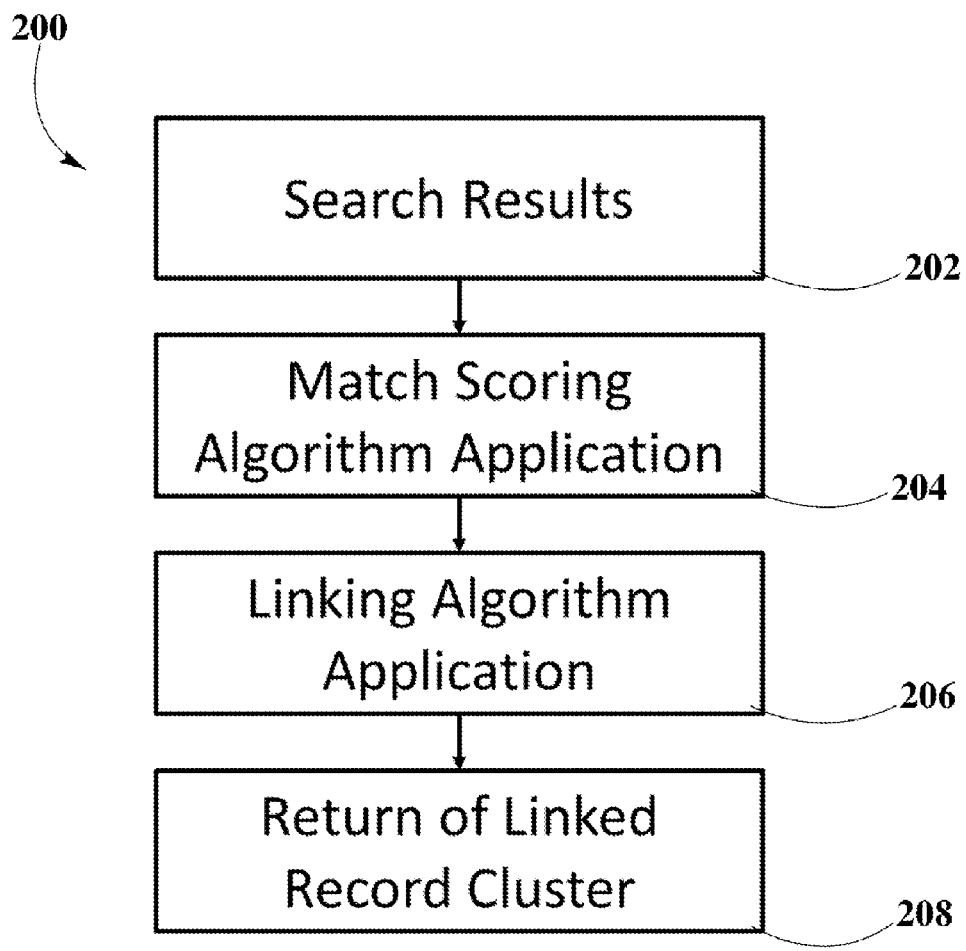
FIG. 2 is a flowchart of process executed by a link on-the-fly module, according to an embodiment.

FIG. 2 is a flowchart of a process 200 executed by a link OTF computer sub-module, which may be employed for disambiguating features in the search method 100 (FIG. 1), according to an embodiment. Link OTF sub-module may be capable of constantly evaluating, scoring, linking, and clustering a feed of information. Link OTF sub-module may perform dynamic records linkage using multiple algorithms. In step 202, search results may be constantly fed into the link OTF computer sub-module. The input of data may be followed by a match scoring algorithm application, step 204, where one or more match scoring algorithms may be applied simultaneously in multiple search nodes of the MEMDB while performing fuzzy key searches for evaluating and scoring the relevant results, taking in account multiple feature attributes, such as string edit distances, phonetics, and sentiments, among others.

Afterwards, a linking algorithm application step 206 may be added to compare all candidate records, identified during match scoring algorithm application step 204, to each other. Linking algorithm application step 206 may include the use of one or more analytical linking algorithms capable of filtering and evaluating the scored results of the fuzzy key searches performed inside the multiple search nodes of the MEMDB. In some examples, co-occurrence of two or more features across the collection of identified candidate records in the MEMDB may be analyzed to improve the accuracy of the process. Different weighted models and confidence scores associated with different feature attributes may be taken into account for linking algorithm application 206.

After linking algorithm application of step 206, the linked results may be arranged in clusters of related features and returned to the user interface, as part of return of linked records clusters, step 208.

Figure 3:
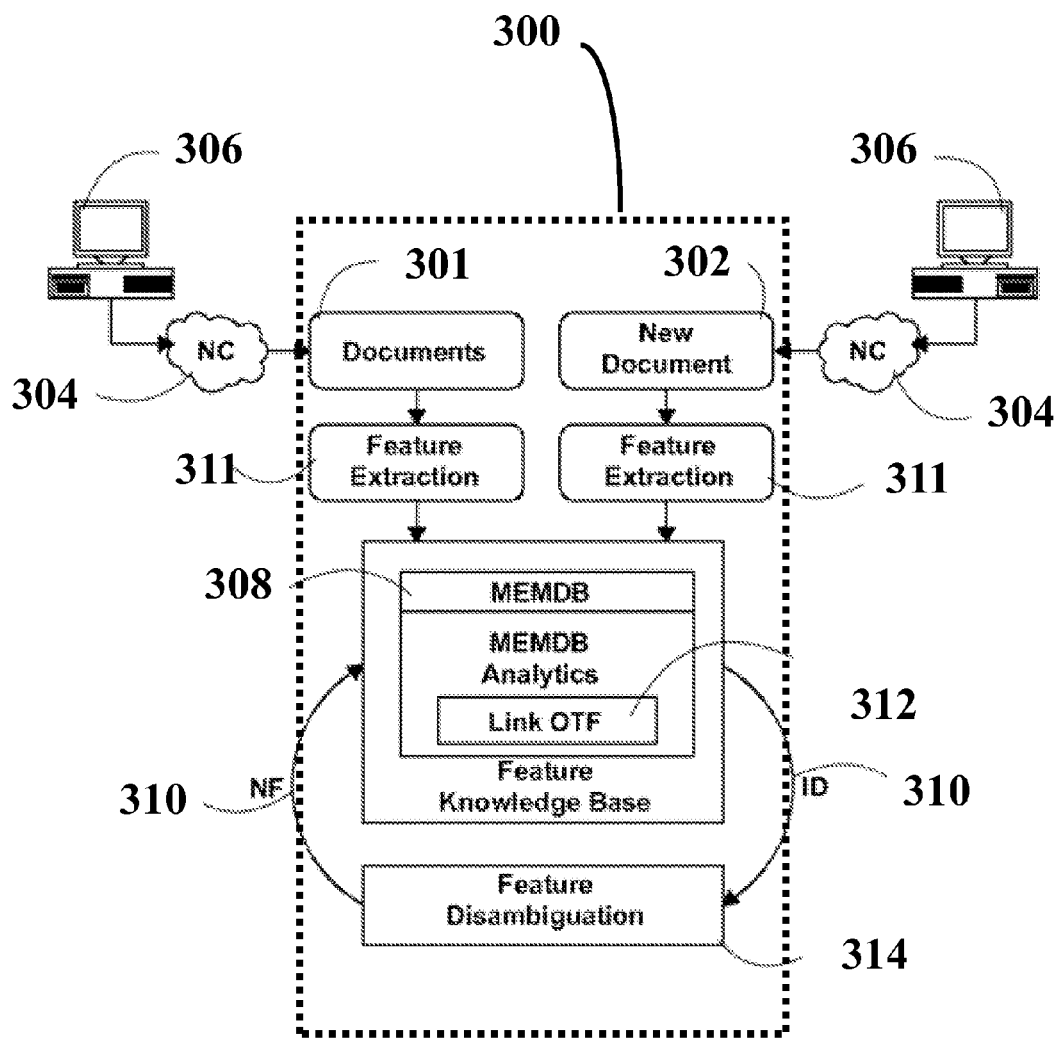
FIG. 3 is a system employed for disambiguating features according to an exemplary embodiment.

FIG. 3 is an illustrative diagram of an embodiment of a system 300 for disambiguating features in unstructured text and including the link OTF sub-module 312 discussed above in connection with FIG. 2. The system 300 hosts an in-memory database and comprises one or more nodes.

According to an embodiment, the system 300 includes one or more processors executing computer instructions for a plurality of special-purpose computer modules 301, 302, 308, 311, 312, and 314 to disambiguate features within one or more documents. As shown in FIG. 3, the document input modules 301, 302 receive documents from internet based sources and/or a live corpus of documents. A large number of new documents may be uploaded substantially simultaneously from a user workstation 306 or other computing device into the document input module 302 through a network connection (NC) 304. Therefore, the source may be constantly receiving an input of new knowledge, using updated information provided by user workstations 306, where such new knowledge is not pre-linked in a static way. Thus, the number of documents to be evaluated may be infinitely increasing. The system 300 is therefore able to process large volumes of documents in a more efficient manner to discover and explore feature knowledge.

An in-memory database (MEMDB) computer 308 may facilitate a faster disambiguation process, such as by executing a disambiguation process on-the-fly, which may facilitate reception of the latest information that is going to contribute to MEMDB 308. Various methods for linking the features may be employed, which may essentially use a weighted model for determining which entity types are most important, which have more weight, and, based on confidence scores, determine how confident the extraction and disambiguation of the correct features has been performed, and that the correct feature may go into the resulting cluster of features. As shown in FIG. 3, as more system nodes are working in parallel, the process may become more efficient.

According to the exemplary embodiment, when a new document arrives into the system 300 via the document input module 301, 302 through a network connection 304, an extraction module 311 performs feature extraction and, then, a feature disambiguation sub-module 314 may perform feature disambiguation on the new document. Extraction module 311 and feature disambiguation module 314 are components of system 300. In the exemplary embodiment extraction module 311 and disambiguation module 314 are separate modules of the system 300, though extraction module 311 and disambiguation module 314 can be configured as a single module, hosted on a single computer, or each can be configured as a separate computer. In one configuration, extraction module 314 and disambiguation module 314 may each be executed by the MEMDB 308.

In one embodiment, after feature disambiguation of the new document is performed by the disambiguation module 314, the extracted new features 310 may be included in the MEMDB 308 to pass through link OTF sub-module 312; where the features may be compared and linked, and a feature ID of disambiguated feature 310 may be returned to the user workstation 306 as a result from a query. In addition to the feature ID, the resulting feature cluster defining the disambiguated feature may optionally be returned to the user workstation 306.

MEMDB computer 308 can be a database storing data in records controlled by a database management system (DBMS) (not shown) configured to store data records in a device's main memory, as opposed to conventional databases and DBMS modules that store data in "disk" memory. Conventional disk storage requires processors (CPUs) to execute read and write commands to a device's hard disk, thus requiring CPUs to execute instructions to locate (i.e., seek) and retrieve the memory location for the data, before performing some type of operation with the data at that memory location. In-memory database systems access data that is placed into main memory, and then addressed accordingly, thereby mitigating the number of instructions performed by the CPUs and eliminating the seek time associated with CPUs seeking data on hard disk.

In-memory databases may be implemented in a distributed computing architecture, which may be a computing system comprising one or more nodes configured to aggregate the nodes' respective resources (e.g., memory, disks, processors). As disclosed herein, embodiments of a computing system hosting an in-memory database may distribute and store data records of the database among one or more nodes. In some embodiments, these nodes are formed into "clusters" of nodes. In some embodiments, these clusters of nodes store portions, or "collections," of database information.

Various embodiments of the system of FIG. 3 provide a computer system executing a feature disambiguation technique that employs an evolving and efficiently linkable feature knowledge base that is configured to store secondary features, such as co-occurring topics, key phrases, proximity terms, events, facts and a trending popularity index. The disclosed embodiments may be performed via various linking algorithms that can vary from simple conceptual distance measure to sophisticated graph clustering approaches based on the dimensions of the involved secondary features that aid in resolving a given extracted feature to a stored feature in the knowledge base.

EXAMPLES

In a first example, the exemplary search method for discovering and exploring feature knowledge is applied. In this example a user initiates a search with the name of a feature, the results return six different disambiguated features with the same name The user decides to narrow the search and indicates in the user interface that a higher threshold or different features for the disambiguation should be used, all the data is processed again in one or more analytics agents and the new set of results returns only two different disambiguated features with the same name.

In a second example, a number of different interfaces serving different purposes for different groups of people are fed from the same MEMDB. Each interface was developed to facilitate the manipulation of the analytical parameters relevant to each application.

In a third example, the exemplary search method for discovering and exploring feature knowledge is applied to images. In this example image processing techniques are utilized to extract features from the documents and suitable analytics modules used to process the search results.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method comprising:
   receiving, by a search manager computer, a search query and a selection from a user interface on a user computing device, wherein the selection includes a level of precision and selects an analytic computer that processes search query results for a presentation to the user, wherein the search manager computer receives the selection before receiving the search query results, wherein the selection selects an analytic method which is applied to the search query results, wherein the search manager computer processes the search query via one or more processes selected from the group consisting of: address standardization, proximity boundaries, and nickname interpretation;
   submitting, by the search manager computer, the search query to a search conductor computer for conducting a search based at least in part on the search query, wherein at least one of the search manager computer, the analytic computer, or the search conductor computer at least partially defines an in-memory database, wherein the search manager computer, the analytic computer, and the search conductor computer are distinct distributed nodes;
   receiving, by the search manager computer, the search query results from the search conductor computer, wherein the search query results having one or more records matching the search query, wherein the search query results are based at least in part on the search, wherein the search query results contain at least one of an alphanumeric content or an image content;
   forwarding, by the search manager computer, based at least in part on the search query results received from the search conductor computer, the search query results to the analytic computer selected by the user to process the search query results for the presentation such that a feature is disambiguated in the search query results according to the level of precision, wherein the analytic computer processes based at least in part on the analytic method, and wherein the analytic method interprets at least one of the alphanumeric content or the image content;
   receiving, by the search manager computer, from the analytic computer, based at least in part on the forwarding, the search query results processed based at least in part on the analytic method by the analytic computer selected by the user; and
   returning, by the search manager computer, the search query results to the user device for the presentation to the user in accordance with the processing based at least in part on the analytic method by the analytic computer.

2. The method of claim 1 wherein the analytic computer disambiguates features in the search query results.

3. The method of claim 2 wherein the selection from the user includes a level of precision for at least one of the search query results and disambiguation of the features in the search query results.

4. The method of claim 1 wherein the analytic computer links the search query results that includes scoring the one or more records in the search query results to indicate a degree of matching to the search query and arranging related features by clusters.

5. The method of claim 1 wherein the selection of the analytic computer is from a set of analytic computers, each of the analytic computers in the set executing a disambiguation computer algorithm having respective weights and confidence scores associated with feature attributes in the search query results.

6. The method of claim 1 wherein the selection from the user includes a threshold of acceptance of the search query results.

7. The method of claim 1 wherein the search query is constructed using a markup language.

8. The method of claim 1 wherein the search query is constructed in a binary format.

9. The method of claim 1 wherein the search manager computer combines the search query results among multiple searches.

10. A system comprising:
one or more server computers having one or more processors executing computer readable instructions for a plurality of code segments including:
a search manager code segment instructed to receive a search query and a selection from a user interface on a user computing device, wherein the selection includes a level of precision and selects an analytic computer code segment that processes search query results for presentation to the user, wherein the search manager code segment receives the selection before receiving the search query results, wherein the selection selects an analytic method which is applied to the search query results, wherein the search manager code segment is configured to process the search query via one or more processes selected from the group consisting of: address standardization, proximity boundaries, and nickname interpretation, wherein the search manager code segment being further configured to:
submit the received search query to a search conductor code segment instructed to conduct a search based at least in part on the search query, wherein at least one of the search manager code segment, the analytic code segment, or the search conductor code segment at least partially defines an in-memory database, and wherein the search manager code segment, the analytic code segment, and the search conductor code segment are distinct distributed node modules,
receive the search query results from the search conductor code segment, wherein the search query results having one or more records matching the search query, wherein the search query results are based at least in part on the search, wherein the search query results contain at least one of an alphanumeric content or an image content,
forward the search query results to the analytic code segment selected by the user to process, based at least in part on the analytic method, the search query results for the presentation such that a feature is disambiguated in the search query results according to the level of precision, wherein the search query results are received from the search conductor code segment, wherein the analytic method interprets at least one of the alphanumeric content or the image content,
receive the search query results processed based at least in part on the analytic method by the analytic code segment selected by the user, wherein the processed search query results are received from the analytic code segment, and
return the search query results to the user device for the presentation to the user in accordance with the processing based at least in part on the analytic method by the analytic code segment.

11. The system of claim 10 wherein the analytic computer module is configured to disambiguate features in the search query results.

12. The system of claim 11 wherein the selection from the user includes a level of precision for at least one of the search query results and disambiguation of the features in the search query results.

13. The system of claim 10 wherein the analytic computer module is configured to link the search query results by being further configured to score the one or more records in the search query results to indicate a degree of matching to the search query and arrange related features by clusters.

14. The system of claim 10 wherein the selection of the analytic computer module is from a set of analytic computer modules, each of the analytic computer modules in the set being configured to execute a disambiguation computer algorithm having respective weights and confidence scores associated with feature attributes in the search query results.

15. The system of claim 10 wherein the selection from the user includes a threshold of acceptance of the search query results.

16. The system of claim 10 wherein the search query is constructed using a markup language.

17. The system of claim 10 wherein the search query is constructed in a binary format.

18. The system of claim 10 wherein the search manager computer module is configured to combine the search query results among multiple searches.

* * * * *